Nov. 25, 1952     A. E. FROSS     2,619,410
APPARATUS FOR EXPLOSIVE CONVERSION OF
HYDROCARBON GASES TO CARBON BLACK
Filed Oct. 30, 1948     2 SHEETS—SHEET 1
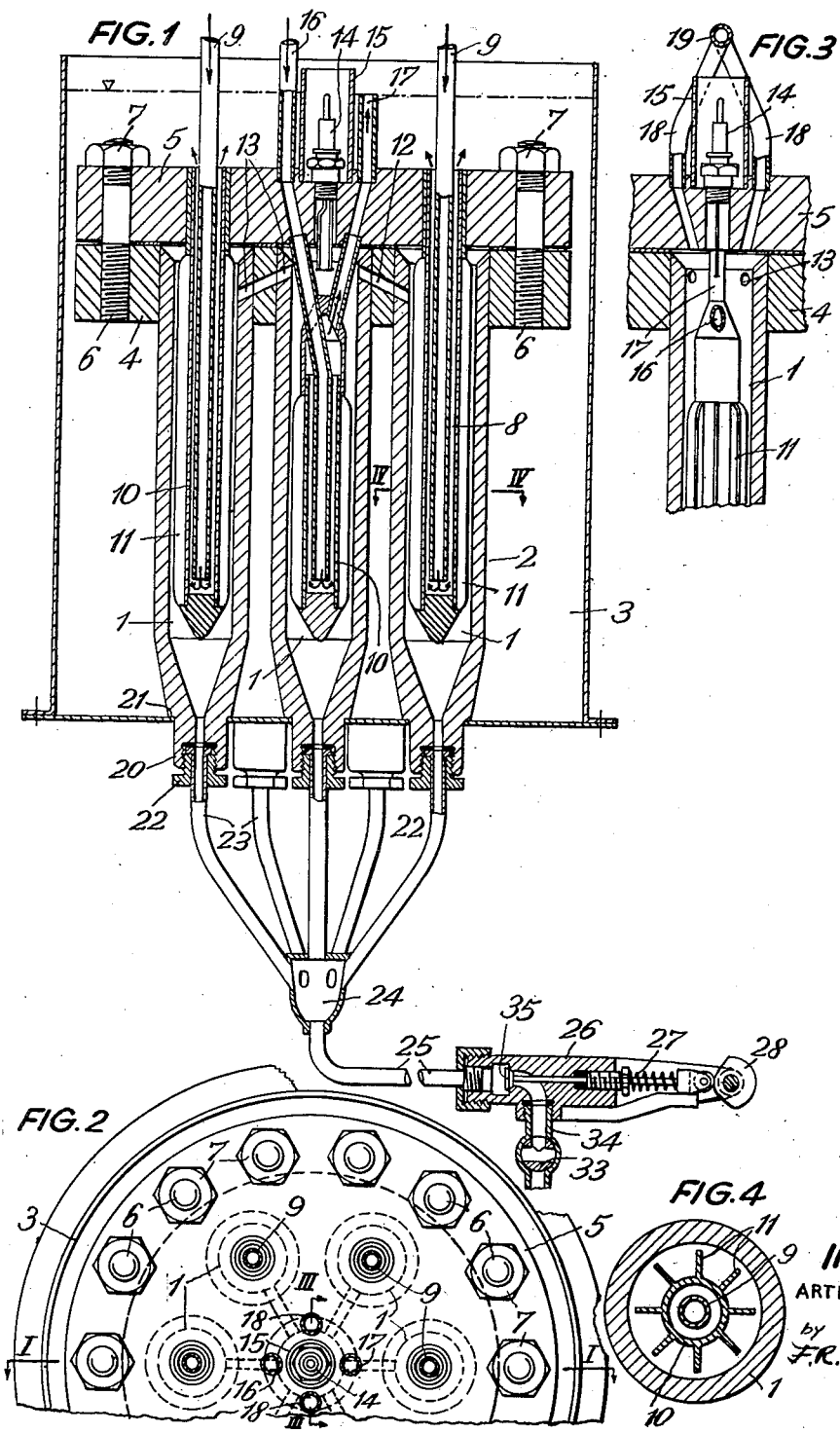
INVENTOR
ARTHUR E. FROSS
by F. R. Jenkins
Agent Nov. 25, 1952     A. E. FROSS     2,619,410
APPARATUS FOR EXPLOSIVE CONVERSION OF
HYDROCARBON GASES TO CARBON BLACK
Filed Oct. 30, 1948     2 SHEETS—SHEET 2

INVENTOR
ARTHUR E. FROSS
by F. R. Jenkins
Agent

Patented Nov. 25, 1952

2,619,410

UNITED STATES PATENT OFFICE 2,619,410

APPARATUS FOR EXPLOSIVE CONVERSION OF HYDROCARBON GASES TO CARBON BLACK

Arthur E. Fross, Basel, Switzerland, assignor to International Carbon-Black Corporation Ltd., Vaduz, Liechtenstein Application October 30, 1948, Serial No. 57,563
In Switzerland June 15, 1948

13 Claims. (Cl. 23—259.5)

It is known that carbon black may be produced by means of explosion-like combustion of saturated or unsaturated gas mixtures containing hydrocarbons in pressure chambers, whereby, in cyclic rotation, groups of chambers are filled with a gas mixture and ignited whereupon the produced carbon black is removed from the chambers by the discharging combustion gases.

The conversion of natural gases, predominantly methane to carbon black has not up to date been possible in a technical and economical manner, since it has been found extremely difficult to obtain thereby carbon black of uniform quality.

In the United States of America an output of approximately 12,000 million pounds of carbon black is produced from natural gas. The Channel process is the most widely used method and it accounts for about 50% of the total production at an efficiency of only 3 to 4 per cent (1000 cubic feet of natural gas yielding 1.4 pounds of carbon black) and it is apparent that new processes to exploit the natural gas at a higher efficiency are in demand in order to economize with the natural resource of methane.

One purpose of this invention is to improve the known process of generating carbon black through explosion-like combustion, of gas mixtures containing hydrocarbon gases, in pressure chambers, in such a way, that in an easy reproducible (or repeatable) manner carbon black of uniform quality may be produced.

Another purpose of this invention is to considerably increase the yield of carbon black from hydrocarbon containing gas mixtures in order to curb the waste of valuable natural resources.

In particular the invention has as an object to combine a first-class quality product with a very high yield in the conversion of natural gas (methane) into carbon black, considerably superior as compared with the conversion methods known hitherto.

The invention also purposes the conversion of acetylene into carbon black of high quality utilizing the same process principle and equipment described herein.

A further purpose of this invention is to enable the conversion of so-called "sour" natural gases, as they are found, for example, in some parts of Texas (U. S. A.) into carbon black of high quality and at a high yield. The use of such "sour" natural gases caused great difficulties to date as during the burning of such gases salt may crystallize and sulfur compounds accumulate on the burner tip and thereby interfere with the proper burning of the gas.

During many years of research work the applicant could state, that yield and quality are closely related to the following variable factors:

(1). Cooling surface being available inside the reaction chamber.

(2). Mixing-ratio of hydrocarbon gas and oxygen respectively air.

(3). Volume of reaction chamber, in which the explosion-like combustion takes place.

The applicant discovered, to his surprise, that with a suitable selection of values for these factors the yield of carbon black from a given volume of gas could be increased considerably, and at the same time a high constancy of high quality could be obtained.

Further, it was discovered, that the increase of yield and the constancy of high quality was greatly dependent on a suitable and effective internal cooling of the reaction chamber.

If one causes the combustion of an air-methane mixture the methane content of which is between 6.1 and 12.8 volume per cent i. e. within the explosion limit, the flame temperature reaches approximately 1500° C.; if for the combustion mixture oxygen is used instead of air, the flame temperature rises to 2200° C. Such high temperatures indicate obviously the importance of an effective internal cooling of the cooling chamber in order to avoid the combustion of the generated carbon.

Further it was found, that, while working with gas-oxygen mixtures of equal ratios the yield does not vary with the size of the combustion chamber i. e. a chamber of 1 liter volume would yield about the same amount of carbon black as the same mixture would yield in a 10 liter chamber. It is therefore obviously advantageous to use rather a multiple of small chambers than a single large chamber. A suitable size of chamber volume is below 2 liters, preferably below 1 liter and especially a volume from 200 cc. to 700 cc., whereby such plurality of small chambers may be arranged in one unit or battery with a single centrally located ignition. Again a plurality of such units may be operated in cyclic rotation.

It is of decisive importance that the combustion chambers be cooled inside as well as outside, as such arrangement will improve both the yield and the quality and further reduce the period of the cycle, which in turn will increase the overall efficiency of the apparatus.

The reaction in the chamber causes very high pressure and temperature and the cycle period is strongly dependent on the cooling time of the chamber. Previous to this invention such combustion chambers were cooled from the outside only which necessitated a waiting period of several minutes between filling the chambers with gas-mixtures.

Such working period may be considerably reduced by selecting chambers of less than 1 liter volume and by using in addition to an external cooling, also an effective cooling, inside the chamber as it is provided for in carbon black plants designed in accordance to this invention. By means of such cooling it is possible to reduce the working period to 30 seconds or less, which—in combination with the much higher yield per unit of volume from small chambers—results in a manifold yield increase as compared with the results of conventional methods.

Only through such an effective internal cooling it becomes possible to operate economically and continuously while producing a uniform product. Furthermore, increasing the internal cooling and the surface area on which the carbon black may settle onto, when it gets liberated at the time of explosion are desirable. The smallness of the chambers (under 1 liter volume) increases the safety of the equipment and makes it possible to build such units from standard pipe material.

The cooling of the chambers has to be so arranged that after the explosion is terminated and until the carbon black and the combustion gases have been removed from the chamber, no condensation of water vapor will take place onto the chamber inside surfaces. This has, for example, been accomplished when the ignition was caused at a chamber temperature of not under 50° C., preferably 70° to 100° C. and the chamber was opened and the pressure released immediately after the explosion took place.

The gases are mixed in a special gas holder previous to the filling of the chambers; this may be for instance a mixture of one part of American natural gas of 96% methane with 4 parts of air (21% oxygen). The mixture is then compressed, preferably to 40 atmospheres and filled in the chambers of 70 to 100° C. temperature.

For gas mixtures with pure oxygen only, the ratio of methane to oxygen has to be 2 to 1 and the filling pressure preferably 10 atmospheres.

The oxygen content may be varied in accordance to the desired shading of the carbon black; the ratio may be found empirically by preliminary tests.

The ratio of mixture of gas and air is also of importance for the production of high quality and yield.

So it is found that by holding all variable factors of the process constant, the ratio of mixture by volume of methane and air at normal pressure and temperature conditions will produce, when set to be:

(a). 1:4—A carbon black of relatively high greasiness and of a composition as it is particularly advantageous for the manufacture of auto tires and rubber goods of a like nature.

(b). 1:4.5—A carbon black of a deep black and of a composition particularly advantageous for the manufacture of printer's ink, carbon black, typewriter ribbons and the like.

(c). 1:5—A carbon black of the quality of a double deep black as it is necessary for the fabrication of high quality varnishes, enamel paints, other paints and the like.

These three types of carbon black and many other steps of quality between, may be produced, with the same apparatus and as a continuously uniform product, just by special adjustment.

The obtained product will be always an active carbon of very fine particle size of the order of colloidal substances.

It can be seen that with the new process a carbon black may be obtained the high quality of which may be easily and dependably repeated in production. It is made possible, by a special internal cooling, by the use of chambers of less than 2000 cc. volume and a filling pressure of over 5 atm., by the arrangement of a centrally located ignition for the operation of a series of chambers and the use of a filter for separating the combustion gases from the carbon, that a battery of, say, seven chambers may be operated in periods of 30 seconds per one reaction cycle.

From a viewpoint of economy this new process will permit a saving of over 50% of natural gas as compared to conventional methods for equal and particularly higher qualities i. e. one may more than double the yield from a given quantity of gas.

The new process is also commercially very interesting as its high yield, it simplicity of operation with a relatively small operating gang and its comparatively small space requirement as compared to the presently used methods, permits cutting the production costs to less than half.

From a technical viewpoint the new process represents a radical deviation from the presently used methods and its fundamentally new ideas render it possible to design equipment of relatively small dimensions and moderate costs.

The invention also covers the design of the apparatus required to convert hydrocarbon gases in accordance to the claimed process invention. The apparatus for this pyrogenic conversion of hydrocarbon gases into carbon black and combustion gases, which is based on the arrangement permitting the ignition of gas mixtures under pressure in pressure-chambers whereby the ignition, the filling and clearing of the chambers are automatically controlled and the gas mixture is supplied through pressure piping, is characterized by the provision of a heat exchanger located in the center and extending over almost the whole length of each chamber and having a cooling surface of an area exceeding the one of the inner surface of the chamber, and by having chambers of a volume of less than 2000 cc. and by cooling said chambers also from the outside.

Such arrangements provide that the free carbon, obtained from the pyrogenic dissociation of hydrocarbons, will find a sufficiently large relatively cool surface area, onto which it may deposit, thus preventing its combustion into CO or $CO_2$. It is apparently the first time that the great value and importance of an effective, internal cooling of a large area has been properly perceived and its importance relative to a substantial increase of yield and quality has been clearly conceived.

The following is a description of the apparatus as shown on the accompanying drawing:

Fig. 1 is a vertical cross-sectional view of I—I of Fig. 2.

Fig. 2 is a plan view of a unit of seven chambers.

Fig. 3 represents cross-section III—III of Fig. 2.

Fig. 4 represents cross-section IV—IV of Fig. 1.

Figure 5:
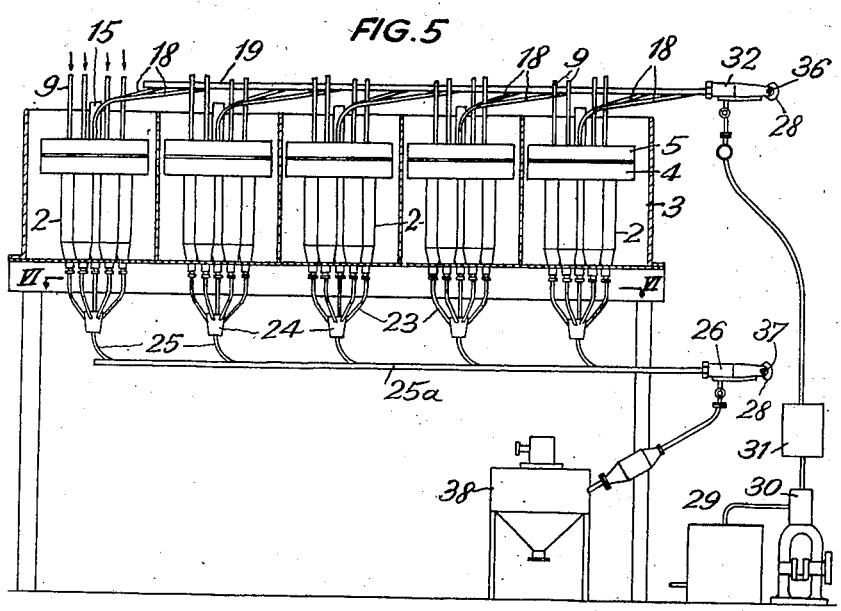
Fig. 5 shows schematically the arrangement of several units in a sub-division of a plant including supply-and-exhaust provisions.

Fig. 1 shows a cross-section through three reaction chambers 1, of which seven are combined in one unit 2. This unit 2 is placed in a cooling tank 3 and its chamber bottom ends are projecting through the tank bottom. The chambers have a shape of elongated cylindrical bodies with conically shaped bottoms and are on top tightly fitted and welded into the flange plate 4. On top of the latter is a copper sheet as gasket, which is covered by the cover plate 5. The whole unit is made gas-tight by means of bolts and nuts 6 and 7.

The cover plate is provided with holes to receive the cooling elements 8, which are welded into the cover plate. The supply pipes for the cooling water are arranged to enter the chambers through the cover plate and lead to practically the bottom of the internal cooling elements. The entering cooling water rises in the elements to the top and overflows there into the cooling tank 3, which is provided with means not shown here, to regulate the water level. The coaxial arrangement of cooling water supply pipe 9 inside of the cooling element 10, which is provided with longitudinal fins 11, both placed in chamber 1 is shown in detail in cross-section Fig. 4. It proved to be practical to arrange six chambers symmetrically around one central chamber, whereby each of these six chambers is connected with the central chamber by means of holes 12 and 13 drilled through the flange and the chamber walls. Figs. 1 and 3 show the altered arrangement of the upper part of the water supply pipe and the cooling element in the central chamber as in this chamber the ignition element has to be placed in the center of it. For the protection of said ignition element, a tube 15 is connected to the upper flange and reaches above the water level. All seven chambers of one operating unit receive their gas charge from the central chambers, which in turn is supplied by line 18 coming from main line 19.

The bottom part of chamber 1, which is of a conical shape, is recessed to form a support area 21 which allows the chamber to rest on the bottom of the water cooling tank, the contact area being made tight against the water pressure in the cooling tank. The bottoms of the chambers are drilled through and provided with a stuffing case 22 for the connection of exhaust pipe 23, through the carbon black and the combustion gases are discharged from the chambers. Pipes 23 lead to the chamber 24, which is connected with valve 26 by connecting pipe 25.

Valve 26 is composed of connecting branch 34, which is controlled by the three way valve 33; the disc valve operated by spring 27 and the cam 28.

Figure 6:
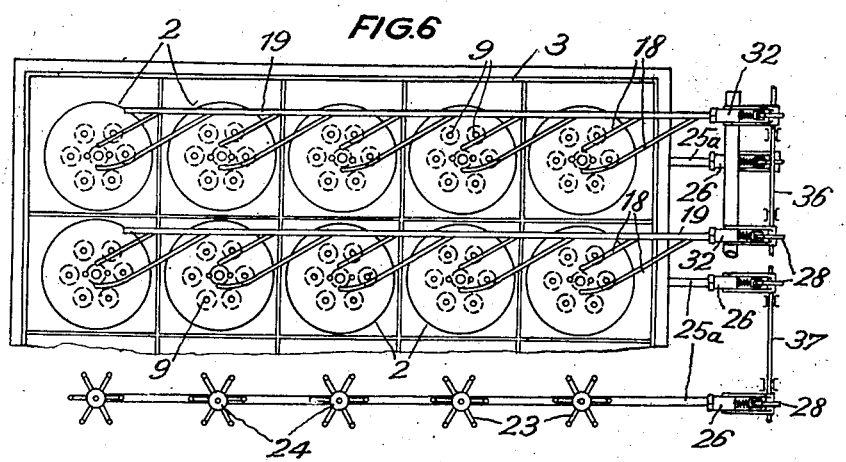
Fig. 6 shows a plan view of a subdivision as per Fig. 5 including a cross-section VI—VI of Fig. 5.

Figs. 5 and 6 show how several operating units of seven chambers each, are combined to form one assembly; whereby all the units located in one line are connected to a common supply line 19 and a common exhaust line 25a.

Gas holder 29 contains the gas mixture to be decomposed, which mixture is being compressed by compressor 30 and stored in storage tank 31. The compressed gas mixture flows under pressure through pipes 19 and 18 into the chambers of the operating units as soon as valve 32 is opened while valve 26 is kept closed. The valves 32 are closed by means of a common cam shaft and the gas mixture in the chambers are ignited by the spark plugs. Immediately after the explosion took place valves 26 are opened and the combustion gases and the carbon black flow through lines 25 and 25a to a cyclone precipitator 38 where the carbon black is separated.

The controls of valves 32 and 26 are preferably interlocked, which is not shown on the drawing. According to arrangement as shown in Figs. 5 and 6 it is provided that the charging of the chambers with gas mixture, the explosion of the mixture and the expulsion of carbon black and the combustion gases will take place simultaneously for all the operating units in one row which are connected to the same lines. While one row is being charged with gas mixture in a second row, the valves are closed and the mixture ignited to explode in a third row the expulsion valves are opened and the combustion gases with the carbon black discharged. Such actuation of the charging and discharging valves of the various rows of units are caused by a respective setting of the cams 28 on the common cam shafts 36 and 37. With such arrangement it is possible to obtain an operating cycle, which will permit, due to the described efficient internal cooling, to explode the gases in each unit row at intervals of 30 seconds or less.

I have found that when the chambers are made of good heat conducting metal, such as copper, and the walls about 1 cm. thick, and the internal cooling element proportioned substantially as shown in Figs. 1 and 4 I obtain a 25% yield in the conversion of methane to carbon black. In such a device the area of the inner chamber wall and the exposed area of the cooling element totaled about 2500 sq. cm. and the average gas space (including connecting lines) was about 500 cc.

I prefer that the ratio of effective cooling area to effective chamber volume be between 15 and 2, such ratios being in terms of square centimeters to cubic centimeters, though the ratio may be increased without limit save only for the added cost of material and possible clogging due to extreme volume reduction.

I have found that liquid petroleum fractions corresponding roughly, say, to gasoline and which may be readily vaporized are also good as sources of hydrocarbons for use in the process and apparatus. Tests show that yields up to about 60% and 80% are obtained when such petroleum vapors are used.

I have further found that rapid expansion of the combustion gases formed when various hydrocarbons, including methane, are used permits ease of maintenance of the required operating temperature. Thus by reducing the cycle from 30 seconds, as stated above, to 10 seconds, and less not only is the problem of heat transfer considerably reduced by immediate exhaustion of the gases but the capacity of the system is correspondingly increased.

The invention claimed is:

1. An apparatus for making carbon black comprising an elongated heavy pipe of heat conducting material; inlet and outlet means at opposite ends thereof; a water jacket around the pipe; a tubular cooling element provided with fins thereon within the pipe substantially coaxial therewith and extending more than half the length of the pipe, said fins lying substantially in planes radial to the axis of the pipe, the external area of the element including the fins being greater than the internal area of the pipe; and means for igniting gaseous contents of the pipe.

2. An apparatus as in claim 1 said pipe being vertical and the inner wall of the lower end of the pipe being frusto-conical.

3. An apparatus as in claim 1 the gas space in the pipe exclusive of the volume occupied by the element and fins being less than 2 liters.

4. An apparatus as in claim 3 the gas space being between 200 cc. and 700 cc.

5. An apparatus for the explosive conversion of hydrocarbon gaseous material to carbon black comprising a tube substantially closed at each end and of less than 2 liters in volume; a hollow coolant member having fins thereon and disposed within the tube, the fins being radial to the tube to provide longitudinal flame passageways between the fins along the length of the tube the external area of the member being greater than the internal area of the tube; means for circulation of a liquid coolant into and out of the member; means for filling the space between the member and tube with a hydrocarbon oxygen explosive mixture at about at least 10 atmospheres pressure; an igniter plug always in communication with the interior of the tube and said passageways for exploding the mixture; valve means for substantially opening the tube after the explosion; and a cooling jacket surrounding said tube.

6. An apparatus for the explosive conversion of hydrocarbons to carbon black comprising a main and a plurality of secondary cylindrical pressure chambers, each chamber being of less than 2000 cc. volume and provided with an internal cooling element that extends over substantially the whole length of the chamber, said element having a cooling area larger than the internal area of the chamber, the secondary chambers being located around the main chamber, a header on the top of the chambers provided with communicating channels between each secondary chamber and the main chamber, and an igniter mounted in the header and projecting into the main chamber.

7. An apparatus for the explosive conversion of hydrocarbon gases into carbon black and comprising a centrally located cylindrical pressure chamber tube of less than 2000 cc. in volume, inlet means in one end of the tube for admitting gases thereinto; ignition means in the end of the chamber for ignition of said gases; a plurality of cylindrical outer chamber tubes disposed about the central chamber tube, a header provided with holes into which the respective ends of the tubes are secured, the header and tubes being provided with radial bores near the respective ends of the chambers to establish communication between each outer tube and the central chamber; a cover plate covering and substantially sealing off the said ends of all tubes; hollow coolant members closed at their inner ends and having external fins disposed in and substantially the length of the chamber tubes and passing through and secured to the cover plate; means for passing a flow of a coolant into and out of the members; and means at the opposite ends of the chamber tubes for controlling the exit of carbon and gases therefrom.

8. An apparatus for the conversion of hydrocarbon gases into carbon black and comprising a main axially vertical cylindrical pressure chamber tube of less than 2000 cc. in volume, inlet means in the top of the tube for admitting gases thereinto; a plurality of axially vertical cylindrical outer chamber tubes each of less than 2000 cc. in volume and disposed about the central chamber tube; a head piece provided with holes into which the upper ends of the tubes are secured, the head piece and tubes being provided with bores near the top of the chambers to establish communication from the top portion of each outer tube to the central chamber; an igniter in the central tube near said bores, a cover plate covering and substantially sealing off the upper ends of all tubes; hollow coolant members closed at their lower ends and depending in the chamber tubes and passing through the cover plate, the interior of the members being open to the exterior of the plate; means for passing a flow of a coolant into the members; and means at the lower ends of the chamber tubes for controlling the exit of carbon and gases therefrom.

9. An apparatus for the explosion-conversion of hydrocarbon gases into carbon black and comprising a centrally located axially vertical cylindrical pressure chamber tube of less than 2000 cc. in volume; inlet means at the top of the tube for admitting gases thereinto; ignition means in the top of the tube for ignition of said gases; a plurality of axially vertical cylindrical outer chamber tubes each less than 2000 cc. in volume and disposed about the central chamber tube; a lower disk provided with holes into which the upper ends of the tubes are received fluid-tight, the disk and tubes being provided with radial bores near the top of the tubes to establish communication from the top portion of each outer tube to the central tube; a cover plate removably secured on top of the disk and covering and substantially sealing off the upper ends of all tubes, hollow coolant members closed at their lower ends and having external fins depending in, and substantially the length of, the chamber tubes and passing through and secured to the cover plate whereby the cover and members may be removed as a unit; means for passing a flow of coolant into the bottom of the members; valved means at the lower ends of the chamber tubes for controlling the exit of carbon and gases therefrom; gasket means between the plate and disk and about the coolant members for preventing leakage of gases from the chamber tubes, a coolant bath tank surrounding the tubes, and means for automatically filling the tubes through said inlet means, energizing said ignition means and for operating said valved means all in a timed sequence.

10. An apparatus for making carbon black by explosive combustion comprising an elongated heavy pipe of heat conducting material and inlet and outlet means at opposite ends thereof; a cooling jacket around the pipe, and a cooling element provided with fins within the pipe substantially coaxial therewith and extending more than half the length of the pipe and leaving a gas space within the pipe, the fins being parallel to the axis of the pipe so that a net flow of gases from the inlet means to the outlet means will sweep off carbon deposited on the fins, the external area of the element including the fins being greater than the internal area of the pipe; and an igniter plug having a part in the pipe for igniting gases within the pipe.

11. An apparatus as in claim 10, the gas space in the pipe being less than two liters.

12. An apparatus as in claim 10 the gas space being between 200 cc. and 700 cc.

13. An apparatus as in claim 10 said pipe being vertical and the inner wall of the lower end of the pipe being frusto-conical.

ARTHUR E. FROSS.

REFERENCES CITED

The following references are of record in the file of this patent:

UNITED STATES PATENTS

| Number | Name | Date |
|---|---|---|
| 779,728 | Morehead | Jan. 10, 1905 |
| 872,949 | Machtolf | Dec. 3, 1907 |
| 986,489 | Morehead | Mar. 14, 1911 |
| 1,048,186 | Lomschakow | Dec. 24, 1912 |
| 2,085,924 | Riegler | July 6, 1937 |
| 2,117,337 | Lobe et al. | May 17, 1938 |
| 2,150,790 | Von Szeszich | Mar. 14, 1939 |
| 2,185,929 | Simpson et al. | Jan. 2, 1940 |
| 2,228,543 | Vollbrecht et al. | Jan. 14, 1941 |

FOREIGN PATENTS

| Number | Country | Date |
|---|---|---|
| 23,336 | Great Britain | 1904 |
| 340,235 | Great Britain | Dec. 12, 1930 |
| 334,177 | France | July 28, 1903 |